United States Patent [19]

Mann et al.

[11] Patent Number: 5,954,813
[45] Date of Patent: Sep. 21, 1999

[54] DATA PROCESSOR WITH TRANSPARENT OPERATION DURING A BACKGROUND MODE AND METHOD THEREFOR

[75] Inventors: Shari L. Mann; David J. A. Pena; Charles F. Studor, all of Austin, Tex.; Gordon W. McKinnon, Hazelwood, United Kingdom

[73] Assignee: Motorola, Inc., Schaumburg, Ill.

[21] Appl. No.: 08/789,170

[22] Filed: Jan. 24, 1997

Related U.S. Application Data

[63] Continuation of application No. 08/336,967, Nov. 10, 1994, abandoned.

[51] Int. Cl.⁶ .................................................. G06F 15/76
[52] U.S. Cl. .......................................... 712/43; 710/14
[58] Field of Search ........................ 395/800.01, 800.32, 395/800.43, 828, 833, 834, 835, 838, 839, 182.03, 182.08, 183.16, 282–283; 364/131–134, 707; 711/115, 134, 145

[56] References Cited

U.S. PATENT DOCUMENTS

| | | | |
|---|---|---|---|
| 4,056,846 | 11/1977 | Callahan et al. | 395/650 |
| 4,532,587 | 7/1985 | Roskell et al. | 395/800 |
| 4,545,015 | 10/1985 | Baunach et al. | 364/419.1 |
| 4,674,089 | 6/1987 | Poret et al. | 371/25 |
| 4,813,009 | 3/1989 | Tallman | 364/900 |
| 4,942,516 | 7/1990 | Hyatt | 395/800 |
| 5,073,968 | 12/1991 | Morrison | 395/500 |
| 5,084,814 | 1/1992 | Vaglica et al. | 395/325 |
| 5,142,675 | 8/1992 | Oi et al. | 395/650 |
| 5,157,781 | 10/1992 | Harwood et al. | 395/183.06 |
| 5,307,464 | 4/1994 | Akao et al. | 395/156 |
| 5,426,744 | 6/1995 | Sawase et al. | 395/375 |
| 5,530,858 | 6/1996 | Stanley et al. | 395/650 |

OTHER PUBLICATIONS

Motorola, Inc.; "DSP96002 IEEE Floating–Point Dual–Port Processor User's Manual;" 1989; Section 10: On–Chip Emulator; pp. 10–1 through 10–22.

Steven H. Leibson; "In–Circuit emulators for βCs;" EDN; Jul 20, 1989; pp. 64–78.

*Primary Examiner*—Alpesh M. Shah
*Attorney, Agent, or Firm*—Paul J. Polansky

[57] ABSTRACT

A data processor such as an integrated circuit microcontroller (10) includes a central processing unit (12), a system integration module (14), and on-chip peripherals (16, 24, 28, 30) commonly connected by an information bus (32). The microcontroller (10) supports transparent background mode operation by not only preserving the state of the central processing unit (12), but also the states of on-chip peripherals (16, 24, 28, 30). For example, a serial peripheral interface (16) has a status register (86) with some status bits which are cleared in normal mode by reading the status register (86). In background mode, reading the status register (86) does not cause the status bits to be cleared. The system integration module (14) has a control bit, known as the break clear flag enable (BCFE) bit, which selectively allows the states of the on-chip peripherals (16, 24, 28, 30) to be altered when the microcontroller is in background mode.

18 Claims, 3 Drawing Sheets

DATA PROCESSOR WITH TRANSPARENT OPERATION DURING A BACKGROUND MODE AND METHOD THEREFOR

This application is a continuation prior application Ser. No. 08/336,967, filed Nov. 10, 1994, now abandoned.

CROSS REFERENCE TO RELATED, COPENDING APPLICATION

Related subject matter is contained in copending patent application Ser. No. 08/206,287, filed Mar. 7, 1994, invented by James S. Divine and Charles F. Studor, entitled "System and Method for Executing a Branch Instruction" and assigned to the assignee hereof, now U.S. Pat. No. 5,410,660, issued Apr. 25, 1995.

FIELD OF THE INVENTION

This invention relates generally to data processors, and more particularly, to data processors with background modes.

BACKGROUND OF THE INVENTION

Computer systems are classically defined as having a central processing unit (CPU), memory, and input/output peripheral devices. Recent advances in integrated circuit technology have allowed many of the classical computer functions to be integrated onto a single integrated circuit chip. If the chip includes a central processing unit and some peripheral circuits, it may be termed an "integrated data processor". An example of an integrated data processor is the MC68302 Integrated Multiprotocol Processor available from Motorola, Inc. If the chip also includes some memory, it achieves even greater system integration; such a chip may be termed a "microcontroller" although it is also commonly known by a variety of terms such as microcomputer, embedded controller, and the like. An example of a microcontroller is the MC68HC11 Microcontroller also available from Motorola, Inc. Both integrated data processors and microcontrollers include "glue logic" circuitry known as the system integration module, to integrate the on-chip memory and/or peripheral devices with the CPU.

Because of their high level of integration, integrated data processors and microcontrollers are ideal for applications such as automobile engine controllers, refrigerators, cellular telephones, remote controllers, and the like. In order to develop software while operating in these applications, it is helpful to observe the flow of software. This observation allows detection of software bugs, and is accomplished through a diagnostic mode known generally as background mode. In background mode, the data processor can be single-stepped through a series of software instructions. After each instruction, the contents of the CPU's registers can be examined to determine how the software has affected them. It is also helpful to have the capability to alter the registers to observe the effect that a modification to the software would have on operation.

Typically, the data processor also includes circuitry to detect certain conditions which should cause it to enter background mode. These conditions are generally termed breakpoints. A breakpoint may be detected, for example, by observing the CPU accessing a certain memory location or the data bus conducting a certain data pattern. After detecting a breakpoint, the system integration module forces an exception (such as by signalling an interrupt). In response to the exception, the CPU places important information about its operation on the stack. The stacked information allows the CPU to return to normal operating mode after the end of background mode as if nothing had happened. Thus, entering and exiting background mode is generally transparent to the operation of the application.

However, because the data processor contains other peripherals, ensuring that the CPU returns transparently from background mode by itself is not enough. It is desirable for the whole chip to operate transparently. For example, many data processors contain serial communications modules. These modules transmit and receive data, and interrupt the CPU based on the occurrence of certain conditions such as a character transmitted or received. After the CPU receives the interrupt, it reads a status register to determine which event caused the interrupt.

Normally, the breakpoint circuitry provides a signal indicating entry into background mode. This signal causes the peripheral's clock to be stopped, which usually is sufficient to preserve transparent operation. Occasionally during the debugging process it is also desirable also to examine the state of the peripheral. However, reading the peripheral's status register causes the state of the peripheral to be changed. Upon return to normal operating mode, the peripheral's state is different from the state it had on entering background mode. What is needed, then, is a data processor which ensures transparent operation in background mode by allowing the states of peripherals to be examined without altering them. This problem is met with the present invention, whose features and advantages will be more clearly understood from the following detailed description taken in conjunction with the accompanying drawings.

DETAILED DESCRIPTION OF THE PREFERRED EMBODIMENTS

Figure 1:
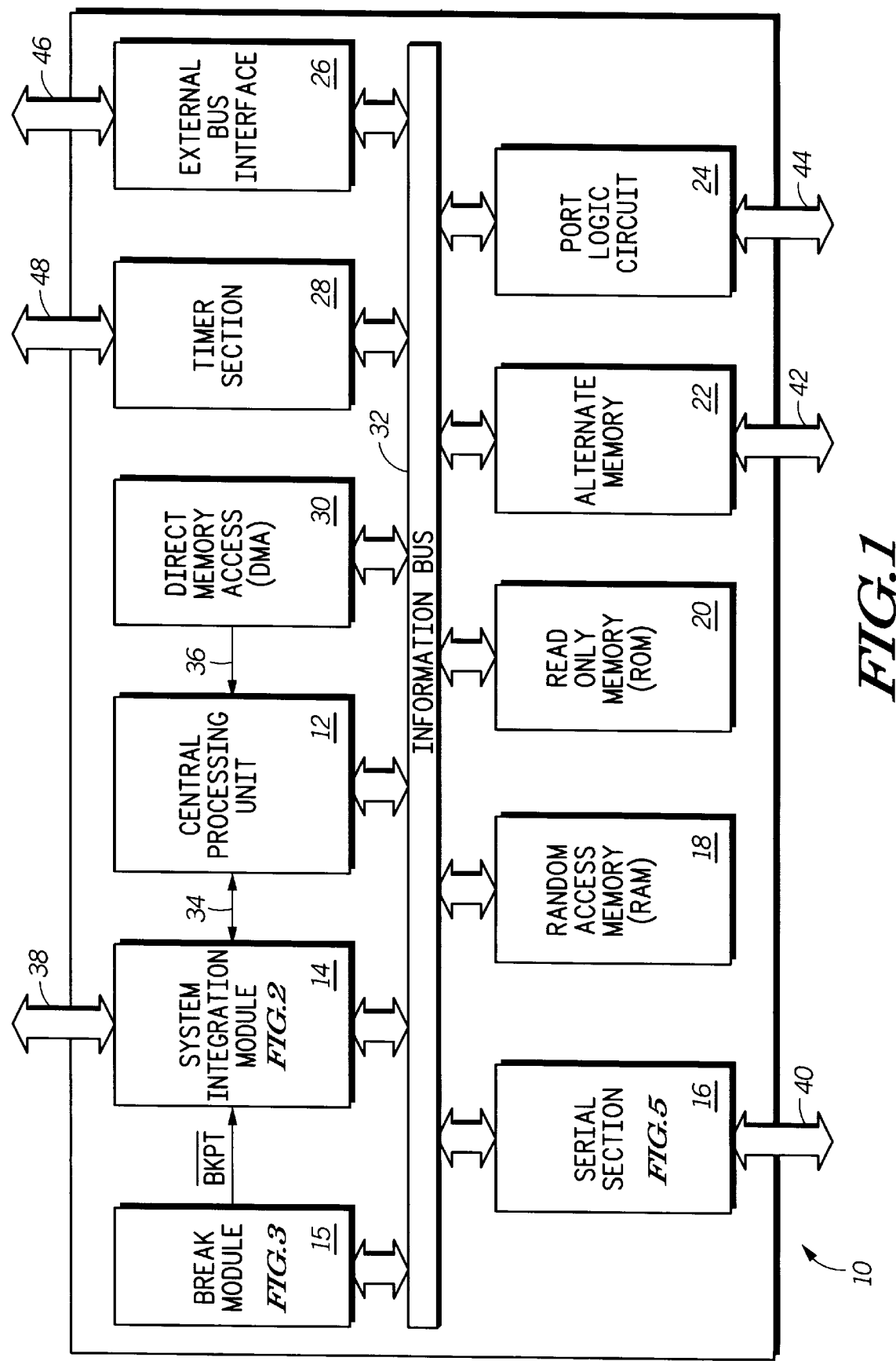
FIG. 1 illustrates in block diagram form a data processor in the form of a microcontroller according to the present invention.

FIG. 1 illustrates a data processor in the form of a microcontroller 10 according to the present invention. Microcontroller 10 is an integrated circuit microcontroller and generally includes a central processing unit (CPU) 12, a system integration module 14, a break module 15, a serial section of circuitry 16, random access memory (RAM) circuit 18, a read only memory (ROM) circuit 20, an alternate memory circuit 22 (e.g., an electrically erasable programmable read only memory, EEPROM), a port logic circuit 24, an external bus interface circuit 26, a timer section of circuitry 28, and a direct memory access (DMA) circuit 30. Each of CPU 12, a system integration module 14, break module 15, serial section 16, RAM 18, ROM 20, alternate memory 22, port logic circuit 24, external bus interface 26, timer circuit 28, and DMA 30 is bi-directionally coupled to an Information Bus 32. CPU 12 and system integration module 14 are bidirectionally coupled via a bus 34. Similarly, CPU 12 is coupled to DMA 30 via a bus 36.

System integration module 14 can receive and transmit signals external to microcontroller 10 by way of a plurality of integrated circuit pins 38. The plurality of integrated circuit pins are not shown in detail herein. Serial section 16 can receive and transmit signals external to microcontroller 10 by way of a plurality of integrated circuit pins 40. Again, the plurality of integrated circuit pins are not shown in detail herein. Depending upon the type of memory, alternate memory 22 may optionally receive and transmit signals external to microcontroller 10 by way of a plurality of integrated circuit pins 42 (not shown in detail herein). Port logic circuit 24 can also receive and transmit signals external to microcontroller 10 by way of a plurality of integrated circuit pins 44. Additionally, external bus interface 26 can receive and transmit signals external to microcontroller 10 by way of a plurality of integrated circuit pins 46. Timer section 28 can also receive and transmit signals external to microcontroller 10 by way of a plurality of integrated circuit pins 48.

FIG. 1 illustrates one possible microcontroller within a family of microcontrollers. Because microcontrollers in the same family of data processors generally have a plurality of differing on-board peripherals, microcontroller 10 provides only one embodiment of the invention described herein. For example, other embodiments of microcontroller 10 may not have ROM 20, external bus interface 26, or DMA 30. Additionally, other co-processors may also be implemented in microcontroller 10. In fact, other embodiments of microcontroller 10 may have fewer, more, or different peripherals than those illustrated in FIG. 1. Additionally, in the embodiment of the invention illustrated in FIG. 1, microcontroller 10 is an eight bit microcontroller which includes sixteen bit addresses and both eight bit and sixteen bit storage registers.

During operation of the embodiment of the invention illustrated in FIG. 1, system integration module 14 is used as a general controller for microcontroller 10. Generally, system integration module 14 provides a plurality of control information to both enable and disable operation, to provide timing control, and to perform exception handling requirements for microcontroller 10. System integration module 14 may interface directly with central processing unit 12 via bus 34, an external user via the plurality of integrated circuit pins 38, and with each of a remaining plurality of components of microcontroller 10 via Information bus 32.

Break module 15 is connected to Information Bus 32 and detects the occurrence of a breakpoint. In response to detecting a breakpoint, break module 15 activates a break signal labelled "$\overline{BKPT}$" to system integration module 14. In response to signal $\overline{BKPT}$, system integration module 14 forces a software interrupt (SWI) instruction into the instruction register of CPU 12. Forcing the SWI instruction causes microcontroller 10 to enter background mode after termination of the current instruction.

System integration module 14 is preferably responsive to an external break input signal as well, to allow an external emulator to force microcontroller 10 into background mode. In this case, the condition on which microcontroller 10 enters the background mode is an OR of the two break conditions, which is implemented as a logical NAND between the active-low $\overline{BKPT}$ and external break signals. This additional break signal source allows the external emulator to force microcontroller 10 into background mode for a wider range of conditions, such as data conducted on the data bus, sequences of instructions, etc. This additional break signal source is not further discussed. It should be apparent that only one break signal source is necessary. However, break module 15 allows microcontroller 10 to enter background mode even when microcontroller 10 operates in single-chip mode, and thus its inclusion in microcontroller 10 is preferred.

In microcontroller 10, DMA 30 allows direct communication of data between memory internal to microcontroller 10 and a plurality of peripheral devices (not shown). DMA 30 may be optionally implemented on microcontroller 10 when a user requires a fast memory access method. Use and implementation of direct memory access circuits are well known in the data processing art and will not be discussed in further detail.

Timer section 28 executes a plurality of timing functions which are based on a free-running sixteen bit counter. When enabled through the plurality of integrated circuit pins 48, timer section 28 may function to perform an input-capture function, an output-compare functions, a real-time interrupt, or a computer operating properly watchdog function. Implementation and use of each of these functions is well known in the data processing art and will not be discussed in further detail.

External bus interface 26 controls receipt and transmission of address and data values between an external user or external peripheral device and microcontroller 10. External bus interface 26 communicates a plurality of address and data values to a remaining portion of microcontroller 10 via Information bus 32. Use and implementation of external bus interface circuits are well known in the data processing art and will not be discussed in further detail.

Port logic circuit 24 controls operation and functionality of each one of the plurality of integrated circuit pins 44. Port logic circuit 24 configures the plurality of integrated circuit pins 44 to function either as general purpose input/output pins in a first mode of operation. In a second mode of operation, port logic circuit 24 may use each of the plurality of integrated circuit pins 44 to communicate multiplexed address and data information. Use and implementation of port logic circuitry is well known in the data processing art and will not be discussed in further detail.

RAM 18, ROM 20, and alternate memory 22 function to store information necessary for the proper operation of microcontroller 10. Additionally, other data and address values may be stored therein if specified in a user program. Use and implementation of memory in microcontrollers is well known in the art and will not be discussed in further detail.

Serial section 16 communicates serial digital data between microcontroller 10 and an external user or an external peripheral device. The serial digital data and appropriate control signals are communicated via the plurality of integrated circuit pins 40. Serial section 16 illustrates an example of a peripheral whose state is preserved in background mode according to the present invention, and serial section 16 will be further described with respect to FIG. 5 below.

CPU 12 executes a program consisting of specific instructions from the instruction set of CPU 12, during the operation of microcontroller 10. A variety of microprocessor and microcontroller instruction sets are known in the art and it should be apparent that a microcontroller according to the present invention may operate with a wide variety of instruction sets. Thus, the specific instruction set of CPU 12 will not be further discussed.

Figure 2:
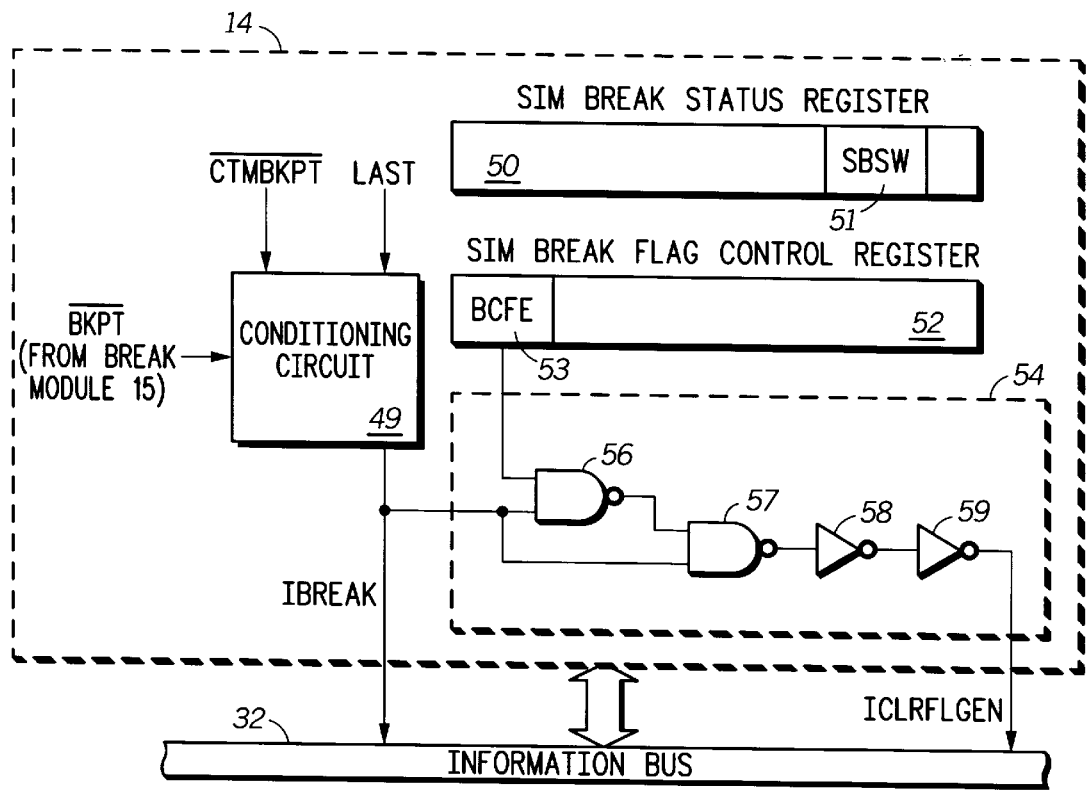
FIG. 2 illustrates in block diagram the system integration module of the microcontroller of FIG. 1.

FIG. 2 illustrates in block diagram form a portion of system integration module 14 of microcontroller 10 of FIG.

1 useful in understanding the present invention. From FIG. 2 it is seen that system integration module 14 includes generally a conditioning circuit 49, a register 50 labelled "SIM BREAKPOINT STATUS REGISTER", a register 52 labelled "SIM BREAK FLAG CONTROL REGISTER", a logic circuit 54.

Conditioning circuit 49 has a first input terminal for receiving signal $\overline{BKPT}$ from break module 15, a second input terminal for receiving a signal labelled "$\overline{CTMBKPT}$", a third input terminal for receiving a signal labelled "LAST", and an output terminal for providing a signal labelled "IBREAK" to Information Bus 32. Conditioning circuit 49 is a logic circuit which recognizes either an internal break condition (by break module 15 activating signal $\overline{BKPT}$), or an external break condition by the activation of input signal $\overline{CTMBKPT}$. Conditioning circuit 49 activates signal IBREAK in response to the activation of either of signals $\overline{BKPT}$ or $\overline{CTMBKPT}$, and signal IBREAK is synchronized to an instruction boundary as indicated by the activation of signal LAST. When active, signal LAST indicates that the current clock cycle is the last clock cycle of an instruction. To exit background mode, both break module 15 and the external break module hold off deactivating their respective breakpoint signals until the last cycle of a return from interrupt (RTI) instruction. The additional logic which detects the RTI instruction is not shown in FIG. 2.

Registers 50 and 52 are memory-mapped registers which appear in the address space of CPU 12, and more particularly, in a portion of the address space which includes registers related to the operation of system integration module 14. Register 50 has a bit which is known as the SIM Break/Stop/Wait (SBSW) bit 51. SBSW bit 51 is useful in applications requiring a return to wait or stop mode after exiting from a break interrupt. If set to a binary one, SBSW bit 51 indicates that stop or wait mode was exited by a break interrupt. If cleared to a binary zero, SBSW bit 51 indicates that stop or wait mode was not exited by a break interrupt. This bit is cleared by writing a binary 0 to bit position 1 of register 50. Stop and Wait modes are modes which allow microcontroller 10 to operate with reduced power, as taught by Smith et al. in U.S. Pat. No. 4,748,559, entitled "Apparatus for Reducing Power Consumed by a Static Microprocessor", issued May 31, 1988.

Register 52 has a bit which is known as the breakpoint clear flag enable (BCFE) bit 53. BCFE bit 53 defaults to being cleared at a binary 0 at reset, but is alterable thereafter. Register 52 has an output which conducts a signal indicative of the state of BCFE bit 53 to an input of logic circuit 54. BCFE bit 53 is a readable, writable bit which determines whether software can affect the state of peripherals during background mode. When set to a binary 1, BCFE bit 53 enables software to alter the state of peripherals during background mode. For example, an access to a peripheral's status register is allowed to clear some or all of its bits, when BCFE bit 53 is set. To clear status bits during background mode, BCFE bit 53 must be set to a binary 1. If cleared to a binary 0, BCFE bit 53 indicates that status bits are not clearable during background mode.

Logic circuit 54 includes NAND gates 56 and 57, and inverters 58 and 59. NAND gate 56 has a first input terminal connected to register 52 for receiving the logic signal indicative of BCFE bit 52, a second input terminal for receiving signal $\overline{BKPT}$ from break module 15, and an output terminal. NAND gate 57 has a first input terminal connected to the output terminal of NAND gate 56, a second input terminal for receiving signal $\overline{BKPT}$, and an output terminal.

Inverter 58 has an input terminal connected to the output terminal of NAND gate 57, and an output terminal. Inverter 59 has an input terminal connected to the output terminal of inverter 58, and an output terminal for providing a signal labelled "ICLRFLGEN" to Information Bus 32. Logic circuit 54 operates to activate signal ICLRFLGEN during background mode, if BCFE bit 53 is set. BCFE bit 53 thus allows the user to determine whether an access to a peripheral receiving signal ICLRFLGEN is allowed to change its state.

Figure 3:
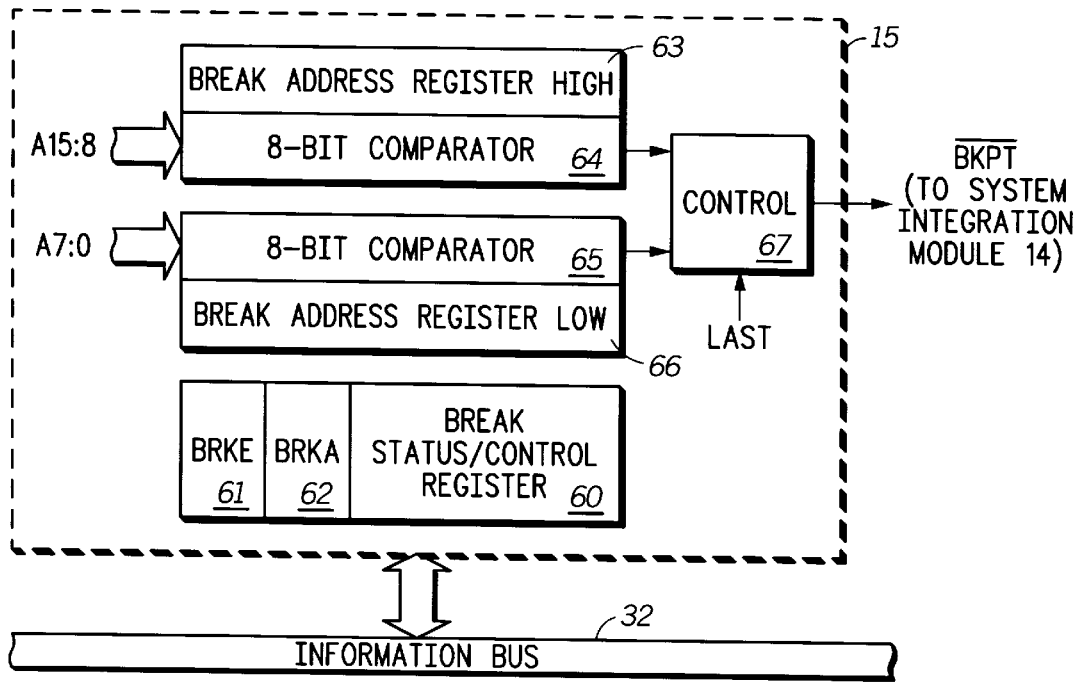
FIG. 3 illustrates in block diagram form the break module of the microcontroller of FIG. 1.

FIG. 3 illustrates in block diagram form break module 15 of microcontroller 10 of FIG. 1. Break module 15 includes a register 60 labelled "BREAK STATUS/CONTROL REGISTER". Register 60 is a readable, writable memory-mapped register which includes a break enable (BRKE) bit 61 and a break active (BRKA) bit 62. BRKE bit 61 is a readable, writable bit which enables breaks on break address register matches. When set to a binary 1, BRKE bit 61 enables the generation of signal $\overline{BKPT}$ on 16-bit address matches. When cleared to a binary 0, BRKE bit 61 disables the generation of signal $\overline{BKPT}$ on 16-bit address matches. BRKE bit 61 may be cleared by writing a logic zero before exiting the break routine, and is automatically cleared on reset. BRKA bit 62 is a readable, writable status bit which break module 15 sets to a binary 1 after detecting a break address match. This bit may be cleared to a binary 0 by writing it to a logic zero before exiting the break routine. This bit is also cleared on reset.

Break module 15 also includes circuitry for activating signal $\overline{BKPT}$ on a 16-bit address match, including a register 63 known as the BREAK ADDRESS REGISTER HIGH, an 8-bit comparator 64, an 8-bit comparator 65, a register 66 known as the BREAK ADDRESS REGISTER LOW, and a control block 67. Registers 63 and 66 are readable, writable registers containing the 8-bit low and high portions of the match address, respectively. Comparator 64 has a first input for receiving the high portion of the bus address labelled "A15:8", a second input connected to register 63, and an output which is active in response to a match between A15:8 and the contents of register 63. Comparator 65 has a first input for receiving the low portion of the bus address labelled "A7:0", a second input connected to register 66, and an output which is active in response to a match between A7:0 and the contents of register 66. Control block 67 has a first input connected to the output of comparator 64, a second input connected to the output of comparator 65, a third input for receiving signal LAST, and an output for providing signal $\overline{BKPT}$. Control block 67 activates signal $\overline{BKPT}$ if BRKE bit 61 is set and both inputs are active, and deactivates signal $\overline{BKPT}$ in response to signal LAST, at the end of an RTI instruction. At the same time as it activates signal $\overline{BKPT}$, control block 67 sets BRKA bit 62.

Figure 4:
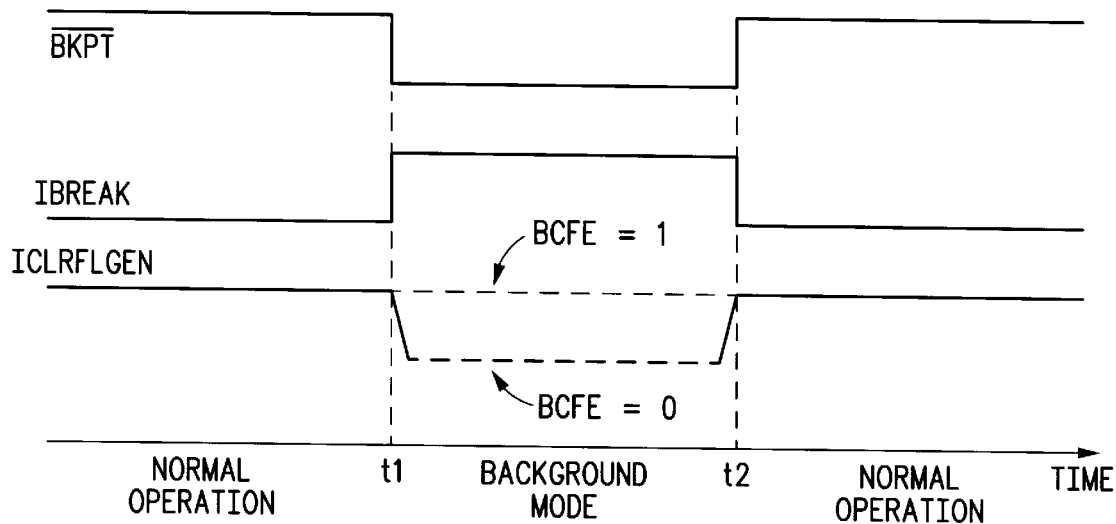
FIG. 4 illustrates a timing diagram useful in understanding the microcontroller of FIG. 1.

Operation during background mode is more clearly described in FIG. 4, which illustrates a timing diagram useful in understanding microcontroller 10 of FIG. 1. In FIG. 4, the horizontal axis represents time. Two time points of interest are designated "t1" and "t2", respectively. Before time t1, microcontroller 10 is in a normal operation mode. This mode is indicated by signal $\overline{BKPT}$ being inactive at a logic high. Signal IBREAK is inactive at a logic low. At time t1, which occurs at the end of the current CPU instruction cycle, system integration module 14 activates signal IBREAK. Thus, between time t1 and time t2, microcontroller 10 is in background mode. Signal ICLRFLGEN is active at a logic high when microcontroller 10 is in normal operation mode. During background mode, signal ICLRFLGEN has a logic state dependent on the state of the BCFE bit. If the BCFE bit is cleared (binary 0 ), logic circuit 54 deactivates signal ICLRFLGEN at a logic low. Thus, examination of registers in any peripheral receiving signal ICLRFLGEN cannot cause the peripheral to alter its state. If, however, the user sets BCFE bit 52 after reset to a binary 1 , then signal ICLRFLGEN is active at a logic high during background mode, and attempts to read peripherals' registers may result in a change in logic state.

EXAMPLE OF TRANSPARENT PERIPHERAL OPERATION WHILE IN BACKGROUND MODE

Figure 5:
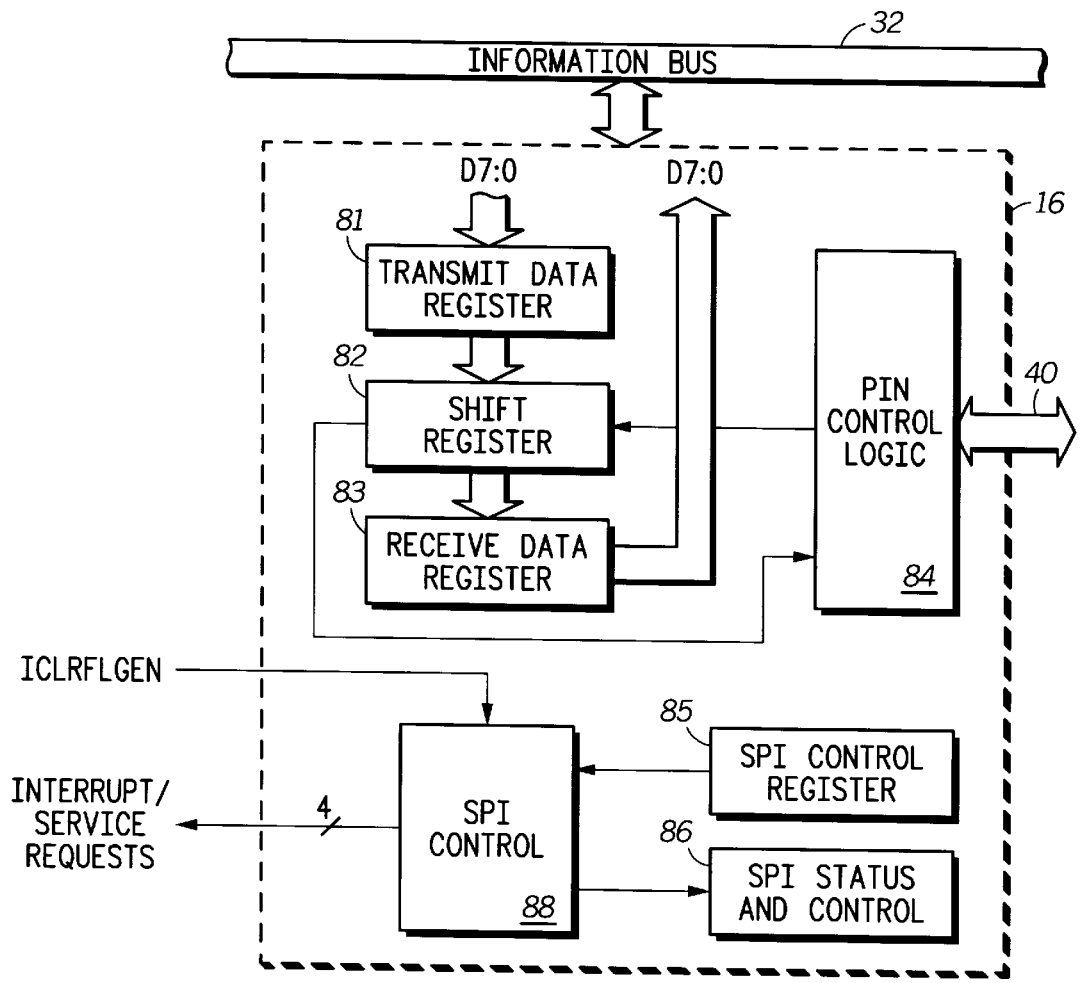
FIG. 5 illustrates a block diagram a portion of the serial section of FIG. 1 which is useful in understanding the present invention.

The ability of microcontroller 10 to sustain the state of the peripherals in background mode is best understood by way of a particular example. FIG. 5 illustrates a block diagram of serial section 16 of microcontroller 10 of FIG. 1. Serial section 16 illustrates three ways in which signal ICLRFLGEN can be used to preserve the state of a peripheral during background mode. First, some control bits in a status register of serial section 16 are cleared in response to reading them. Signal ICLRFLGEN determines whether these bits will be cleared in background mode after being read, or whether they retain their previous states. Second, reading the status register does not immediately clear some other control bits. Rather, the act of reading these status bits arms the clearing mechanism; clearing is completed upon the occurrence of some other condition. An example of this mechanism is the writing to another register. Signal ICLRFLGEN allows the act of reading the status register not to arm the clearing mechanism. Third, writing to another register may cause a bit in the status register to be cleared. Signal ICLRFLGEN, however, allows a write to this other register to not alter the status register.

Turning now to FIG. 5, it is seen that serial section 16 includes a transmit data register 81, a shift register 82, a receive data register 83, a pin control logic block 84, a register 85 labelled "SPI CONTROL REGISTER", a register 86 labelled "SPI STATUS AND CONTROL REGISTER 86", and a serial peripheral interface (SPI) control block 88. Transmit data register 81 is an 8-bit register with an input for receiving an 8-bit data element from the data portion of Information Bus 32, labelled "D7:0", and an 8-bit output connected to an input of shift register 82. Shift register 82 also has an 8-bit output connected to an input of receive data register 83. Shift register 82 has a serial input terminal connected to an output terminal of pin control logic block 84, and a serial output terminal connected to an input terminal of pin control logic block 84. Thus, shift register 82 functions with both the transmit and receive portions of serial section 16. For transmit operations, shift register 82 receives a byte of data to be transmitted and shifts the data out one bit at a time to pin control logic block 84. For receive operations, shift register 82 receives a serial data stream from pin control logic block 84 to form bytes of data, which it stores in receive data register 83. Receive data register 83 also has an output for providing signals D7:0 to Information Bus 32.

Pin control logic block 84 is connected to integrated circuit pins 40. Integrated circuit pins 40 together with the registers and control logic of serial section 16 form a serial peripheral interface (SPI). The functions of integrated circuit pins 40 are shown in TABLE 1 below:

TABLE 1

| Pin Name | Direction Master/Slave | Description |
| --- | --- | --- |
| MISO (Master In/ Slave Out) | Input/Output | In full duplex operation, the MISO pin of the master SPI module is connected to the MISO pin of the slave SPI module. The master SPI simultaneously receives data on its MISO pin and transmits data from its MOSI pin. Slave output data on the MISO pin is enabled only when the SPI is configured as a slave. The SPI is configured as a slave when its SPMSTR bit is binary zero and its $\overline{SS}$ pin is at a logic low. |
| MOSI (Master Out/ Slave In) | Output/Input | In full duplex operation, the MOSI pin of the master SPI module is connected to the MOSI pin of the slave SPI module. The master SPI simultaneously transmits data from its MOSI pin and receives data from its MISO pin. In a multiple-slave system, a logic high on the $\overline{SS}$ pin puts the MISO pin in a high impedance state. |
| SPSCK (Serial Clock) | Input/Output | Serial clock. The serial clock synchronizes data transmission between master and slave devices. In a master microcontroller, the SPSCK pin is the clock output. In full duplex operation, the master and slave microcontrollers exchange a byte of data in eight serial clock cycles. In a slave microcontroller, the SPSCK pin is the clock input. |
| $\overline{SS}$ (Slave Select) | Input | Applying a logic high to the $\overline{SS}$ pin of a master SPI module enables the module to transmit data from its MOSI pin. Applying a logic low sets the MODF bit. Applying a logic low to a slave SPI module enables it to receive data on its MOSI pin. This pin must be a logic low for a slave because applying a logic high disables the slave. |

SPI CONTROL REGISTER 85 is a memory-mapped register which contains eight control bits. Register 85 has an output connected to SPI control block 88 to control the operation of serial section 16. The function of each of these bits is described in TABLE 2 below:

TABLE 2

| Bit Name | Description |
| --- | --- |
| SPRIE | SPI Receive Interrupt Enable Bit. This read/write bit enables CPU interrupt requests or DMA service requests generated by the SPRF bit. The SPRF bit is set when a byte transfers from shift register 82 to register 83. Reset clears the SPRIE bit. Disabling the SPI module by clearing the SPE bit also clears SPRIE. |
| DMAS | DMA Select Bit. This read/write bit selects DMA service requests when the SPI receiver full bit (SPRF) or the SPI transmitter empty bit (SPTE) becomes set. Setting the DMAS bit disables SPRF CPU interrupt requests and SPTE CPU interrupt requests. Reset clears the DMAS bit. |
| SPMSTR | SPI Master Bit. This read/write bit selects master mode operation (when set) or slave mode operation (when cleared). |
| CPOL | Clock Polarity Bit. This read/write bit determines the logic state of the SPSCK pin between transmissions. To transmit data between SPI modules, the SPI modules must have identical CPOL bits. Reset clears the CPOL bit. |
| CPHA | Clock Phase Bit. This read/write bit controls the timing relationship between the serial clock and SPI data. To transmit data between SPI modules, the SPI modules must have identical CPHA bits. Reset sets the CPHA bit. |
| SPWOM | SPI Wired-OR Mode Bit. When set, this read/write bit disables the pull-up devices on pins SPSCK, MOSI, and MISO so that those pins become open-drain outputs. |
| SPE | SPI Enable. This read/write bit enables the SPI module when set. Clearing the SPE bit returns the SPI status and |

TABLE 2-continued

| Bit Name | Description |
|---|---|
| | control register to its reset state. |
| SPTIE | SPI Transmit Interrupt Enable. This read/write bit enables CPU interrupt requests or DMA service requests generated by the SPTE bit. SPTE is set when a byte transfers from the transmit data register to the shift register. Reset clears the SPTIE bit. Disabling the SPI module by clearing the SPE bit also clears SPTIE. |

Furthermore, SPI STATUS AND CONTROL REGISTER 86 includes six bits which are related to the status of serial section 16, which are illustrated in TABLE 3 below:

TABLE 3

| Bit Name | Description |
|---|---|
| SPRF | SPI Receiver Full Bit. This clearable, read-only flag is set each time a byte transfers from shift register 82 to receive data register 83. SPRF generates a CPU interrupt request or DMA service request if the SPRIE bit in register 85 is set. The DMAS bit determines whether SPRF generates an SPRF CPU interrupt request or an SPRF DMA service request. Following an SPRF CPU interrupt (DMAS = 0), CPU 12 clears SPRF by reading register 86 and then reading register 83. During an SPRF DMA transfer (DMAS = 1), DMA 30 automatically clears SPRF by reading register 83. |
| OVRF | Overflow Bit. This clearable, read-only bit is set if software does not read the byte in receive data register 83 before the next byte enters shift register 82. In an overflow condition, the byte already in receive data register 83 is unaffected, but the byte that shifted in last is lost. The OVRF bit may be cleared by reading register 86 and then reading register 83. Reset clears the OVRF bit. |
| MODF | Mode Fault Bit. The MODF bit is meaningful only when serial section 16 is in the master mode. This clearable, read-only bit is set if the $\overline{SS}$ pin goes low when the SPMSTR bit is at a binary one. Clear the MODF bit by writing to a register 86. Reset clears the MODF bit. |
| SPTE | SPI Transmitter Empty Bit. This clearable, read-only bit is set each time register 81 transfers a byte of data into shift register 82. SPTE generates an SPTE CPU interrupt request or an SPTE DMA service request if the SPTIE bit in register 85 is set. The DMAS bit in register 85 determines whether SPTE generates an SPTE interrupt request or an SPTE DMA service request. During an SPTE CPU interrupt (DMAS = 0), CPU 12 clears the SPTE bit by writing to register 83. During an SPTE DMA transfer (DMAS = 1), DMA 30 automatically clears SPTE by writing to register 81. |
| SPR1/SPR0 | SPI Rate Select Bits. In master mode, these read/write bits set the baud rate by establishing a divisor of 2, 8, 32, or 128 for values of SP1:SP0 of 00, 01, 10, or 11, respectively. Reset clears these bits. |

In general, SPI control block 88 is a sequential logic block which controls the operation of serial section 16. Part of the operation relates to signalling the transmission of or receipt of data. For this purpose, SPI control block 88 includes a 4-bit output terminal which provides two interrupt request signals to CPU 12 (one to indicate that transmit register 81 is full, and the other to indicate that receive register 83 is empty), and two DMA service request signals to DMA 30 (one to indicate that transmit register 81 is full, and the other to indicate that receive register 83 is empty).

In addition, SPI control block 88 is responsive to signal ICLRFLGEN to provide a mechanism to preserve the state of serial section 16 when microcontroller 10 enters background mode. The effect of ICLRFLGEN on the different bits is shown in TABLE 4 below:

TABLE 4

| Bit Name | Effect of Accessing Register 86 | |
|---|---|---|
| | ICLRFLGEN = 0 | ICLRFLGEN = 1 |
| SPRF | Reading register 86 does not arm the clearing mechanism. | Reading register 86 arms the clearing mechanism. Once the clearing mechanism is armed, a subsequent read of register 83 clears this bit. |
| OVRF | Reading register 86 does not clear this bit | Reading register 86 clears this bit. |
| MODF | No effect. | No effect. |
| SPTE | Writing to register 81 does not affect this bit | This bit is cleared by writing to register 81. |
| SPR1/SPR0 | No effect. | No effect. |

Note that when DMA 30 reads register 86 (and DMAS=1), bits SPRF and SPTE are cleared without any arming mechanism. However, it should be apparent that the status register clearing and arming mechanism is just one example of the possible states that may be preserved conditionally based upon signal ICLRFLGEN.

Additionally, a peripheral may locally determine whether to affect its state during background mode as determined by signal ICLRFLGEN. For example, serial section 16 may include an additional control bit to determine whether it responds to signal ICLRFLGEN for certain state changes. If this status bit is set, then serial section 16 would be responsive to signal ICLRFLGEN to selectively change states during the background mode. That is, serial section 16 would allow certain state changes only if signal ICLRFLGEN is active during background mode. If this status bit is cleared, then serial section 16 would allow state changes during background mode regardless of whether signal ICLRFLGEN is active. In serial section 16, this control bit could be placed in an unused bit position of register 86. As another example, it may be desirable for timer section 28 to have this "local" determination of whether to be responsive to signal ICLRFLGEN. This mechanism provides an additional level of flexibility and may be desirable for some applications. Note that this local control bit may control only some state changes within the peripheral.

While the invention has been described in the context of a preferred embodiment, it will be apparent to those skilled in the art that the present invention may be modified in numerous ways and may assume many embodiments other than that specifically set out and described above. The particular peripheral states that may be selectively altered or preserved in the background mode will vary from embodiment to embodiment. The active logic states of signals used to implement the transparent background mode may be reversed. Furthermore, a data processor according to the present invention may be a microcontroller (having on-chip memory), or just an integrated data processor with at least one on-chip peripheral circuit. Furthermore, the type of peripheral circuits used will vary from embodiment to embodiment. While Information Bus 32 included a 16-bit address bus and an 8-bit data bus, the sizes of the address and data buses will vary from embodiment to embodiment. Accordingly, it is intended by the appended claims to cover all modifications of the invention which fall within the true spirit and scope of the invention.

We claim:

1. A data processor with transparent operation in a background mode, the data processor also having a normal operation mode, comprising:

a central processing unit for executing instructions and accessing memory;

a peripheral circuit coupled to said central processing unit, having a plurality of states, said peripheral circuit making a transition between a first state and a second state in response to said central processing unit performing a predetermined access to said peripheral circuit while the data processor is in the normal operation mode; and a system integration module coupled to said peripheral circuit and operative in the background mode to control said peripheral circuit to prevent a transition between said first state and said second state when said central processing unit performs said predetermined access, whereby the data processor preserves a state of said peripheral circuit during the background mode;

wherein said system integration module controls said peripheral circuit to prevent said transition between said first state and said second state by activating a control signal, and wherein said peripheral circuit further has a control input for receiving said control signal.

2. The data processor of claim 1, wherein said system integration module comprises a register, said register storing a break clear flag enable bit to selectively enable said system integration module to control said transition between said first state and said second state.

3. The data processor of claim 2 further comprising:

an information bus coupled to said central processing unit, to said peripheral circuit, and to said system integration module for conducting signals between each of said central processing unit, said peripheral circuit, and said system integration module; and a break module having an input coupled to said information bus, and an output for providing a break signal, said break signal indicating an entry of the data processor into the background mode.

4. The data processor of claim 1, wherein said peripheral circuit includes a control register having at least one control bit for determining whether said peripheral circuit is responsive to said control signal to make transitions between said first state and said second state during the background mode.

5. The data processor of claim 1 further comprising a second peripheral circuit coupled to said central processing unit and including a control register having at least one control bit for determining whether said second peripheral circuit is responsive to said control signal to make transitions between a plurality of states thereof during the background mode.

6. The data processor of claim 1, wherein said peripheral circuit comprises a serial peripheral interface, and wherein said system integration module is operative in the background mode to control said serial peripheral interface by preventing an alteration of at least one bit of a status register thereof.

7. An integrated circuit microcontroller having a normal operation mode and a background mode, comprising:

a central processing unit for executing instructions and accessing memory, said central processing unit coupled to an information bus;

at least one peripheral circuit coupled to said information bus, each peripheral circuit having a plurality of states and making a transition between said plurality of states in response to said central processing unit accessing said peripheral circuit in the normal operation mode; and a system integration module including a logic circuit operative in the background mode to control each of said at least one peripheral circuit to prevent said transition between said plurality of states thereof when accessed by said central processing unit, whereby the integrated circuit microcontroller preserves a state of each of said at least one peripheral circuit during the background mode;

wherein said system integration module controls each of said at least one peripheral circuit to prevent said transition between said plurality of states by activating a control signal, and wherein a each of said at least one peripheral circuit further has a control input for receiving said control signal.

8. The integrated circuit microcontroller of claim 7, wherein said system integration module comprises a register, said register storing a break clear flag enable bit to selectively enable said system integration module to control said transition between said plurality of states of said at least one peripheral circuit in the background mode.

9. The integrated circuit microcontroller of claim 8 further comprising:

an information bus coupled to said central processing unit, to each of said at least one peripheral circuit, and to said system integration module for conducting signals between each of said central processing unit, each of said at least one peripheral circuit, and said system integration module; and a break module having an input coupled to said information bus, and an output for providing a break signal, said break signal indicating an entry of the integrated circuit microcontroller into the background mode.

10. The integrated circuit microcontroller of claim 7, wherein a first peripheral circuit of said at least one peripheral circuit includes a control register having at least one control bit for determining whether said first peripheral circuit is responsive to said control signal to make transitions between at least two of said plurality of states during the background mode.

11. The integrated circuit microcontroller of claim 7 wherein a second peripheral circuit of said at least one peripheral circuit is coupled to said central processing unit and includes a control register having at least one control bit for determining whether said second peripheral circuit is responsive to said control signal to make transitions between a plurality of states thereof during the background mode.

12. The integrated circuit microcontroller of claim 7, wherein said at least one peripheral circuit includes a comprises a serial peripheral interface, and wherein said system integration module is operative in the background mode to control said serial peripheral interface by preventing an alteration of at least one bit of a status register thereof.

13. A method for operating a data processor transparently in a background mode, comprising the steps of:

storing a break clear flag enable bit, said break clear flag enable bit indicative of whether a state of a peripheral circuit may be affected in the background mode, wherein said state of said peripheral circuit is always affected when said peripheral circuit is in a normal operation mode;

detecting a breakpoint condition, said breakpoint condition causing the data processor to leave the normal operation mode and to enter the background mode;

activating a control signal in response to said step of detecting said breakpoint condition if said break clear flag enable bit is in a first logic state, and keeping said control signal inactive in response to said step of detecting said breakpoint condition if said break clear flag enable bit is in a second logic state; and selectively controlling said peripheral circuit to disable a transition between a plurality of states thereof during the background mode by providing said control signal to an input of the peripheral circuit, wherein when said control signal is active, said state of said peripheral circuit cannot be affected in background mode, and when said control signal is inactive, said state of said peripheral circuit may be affected in the background mode.

14. The method of claim 13 wherein said step of controlling comprises the step of controlling said peripheral circuit to disable a transition between said plurality of states thereof during the background mode further in response to a control bit in a control register of the peripheral circuit.

15. A data processor with transparent operation in a background mode comprising:

a central processing unit for executing instructions and accessing memory;

a peripheral circuit coupled to said central processing unit, having a control register with a plurality of bits which defines a plurality of states, said peripheral circuit making a transition between a first state and a second state in response to said central processing unit reading said control register when a clear flag enable signal is active, and remaining in said first state in response to said central processing unit reading said control register when said clear flag enable signal is inactive; and a system integration module coupled to said peripheral circuit, having an output for providing said clear flag enable signal, said system integration module activating said clear flag enable signal while the data processor is in a normal operation mode and deactivating said clear flag enable signal while the data processor is in the background mode, whereby the data processor preserves a state of said peripheral circuit during the background mode.

16. The data processor of claim 15 wherein said system integration module deactivates said clear flag enable signal in response to entering the background mode, selectively in response to a break clear flag enable bit.

17. The data processor of claim 15 wherein said system integration module has a first input for receiving a first breakpoint signal, and a second input for receiving a second breakpoint signal, said system integration module deactivating said clear flag enable signal in response to an activation of at least one of said first and second breakpoint signals.

18. The data processor of claim 17 wherein said first breakpoint signal is characterized as being a hardware breakpoint signal, and wherein said second breakpoint signal is characterized as being a software breakpoint signal.

* * * * *